(12) United States Patent
Frick

(10) Patent No.: US 6,606,170 B1
(45) Date of Patent: Aug. 12, 2003

(54) APPARATUS FOR THE MANUFACTURE OF A PHOTOGRAPHIC PRINT

(75) Inventor: Beat Frick, Buchs (CH)

(73) Assignee: Gretag Imaging Trading AG, Wettingen (CH)

( * ) Notice: Subject to any disclaimer, the term of this patent is extended or adjusted under 35 U.S.C. 154(b) by 0 days.

(21) Appl. No.: 09/505,878

(22) Filed: Feb. 17, 2000

(30) Foreign Application Priority Data

Feb. 17, 1999 (DE) .................................... 299 02 750 U

(51) Int. Cl.[7] .................................................. H04N 1/04
(52) U.S. Cl. ........................................ 358/474; 358/498
(58) Field of Search .................................. 358/474, 496, 358/44, 498, 296

(56) References Cited

U.S. PATENT DOCUMENTS

| | | | |
|---|---|---|---|
| 4,516,032 A | 5/1985 | Barr | 358/498 |
| 4,520,400 A | 5/1985 | Koumura | 358/296 |
| 4,692,812 A | 9/1987 | Hirahara et al. | 358/285 |
| 4,967,264 A | 10/1990 | Parulski et al. | 358/44 |
| 5,404,206 A | 4/1995 | Andoh et al. | 355/235 |
| 5,751,401 A * | 5/1998 | Takaoka et al. | 355/32 |

FOREIGN PATENT DOCUMENTS

| | | | |
|---|---|---|---|
| DE | 19545625 C1 | 11/1997 | H04N/1/23 |
| EP | 0710019 A2 | 5/1996 | H04N/5/74 |
| JP | 62-6576 | 1/1987 | H04N/1/04 |
| JP | 62-127707 | 6/1987 | G02B/26/02 |
| JP | 9-314910 | 12/1987 | H04N/5/24 |

* cited by examiner

Primary Examiner—Jerome Grant, II
Assistant Examiner—Negussie Worku
(74) Attorney, Agent, or Firm—Burns, Doane, Swecker & Mathis, LLP

(57) ABSTRACT

The invention relates to apparatus for the manufacture of a photographic print on a copier material, whereby an exposure arrangement is provided with a projection optic for the manufacture of the photographic print, which includes a mirror matrix with individually movable mirrors, whereby the exposure arrangement includes a broadband light source, for example a halogen light source, whereby a filter arrangement for filtering or letting pass certain spectral portions or certain amounts of light is positioned in the light path between the light source and the mirror matrix.

8 Claims, 4 Drawing Sheets

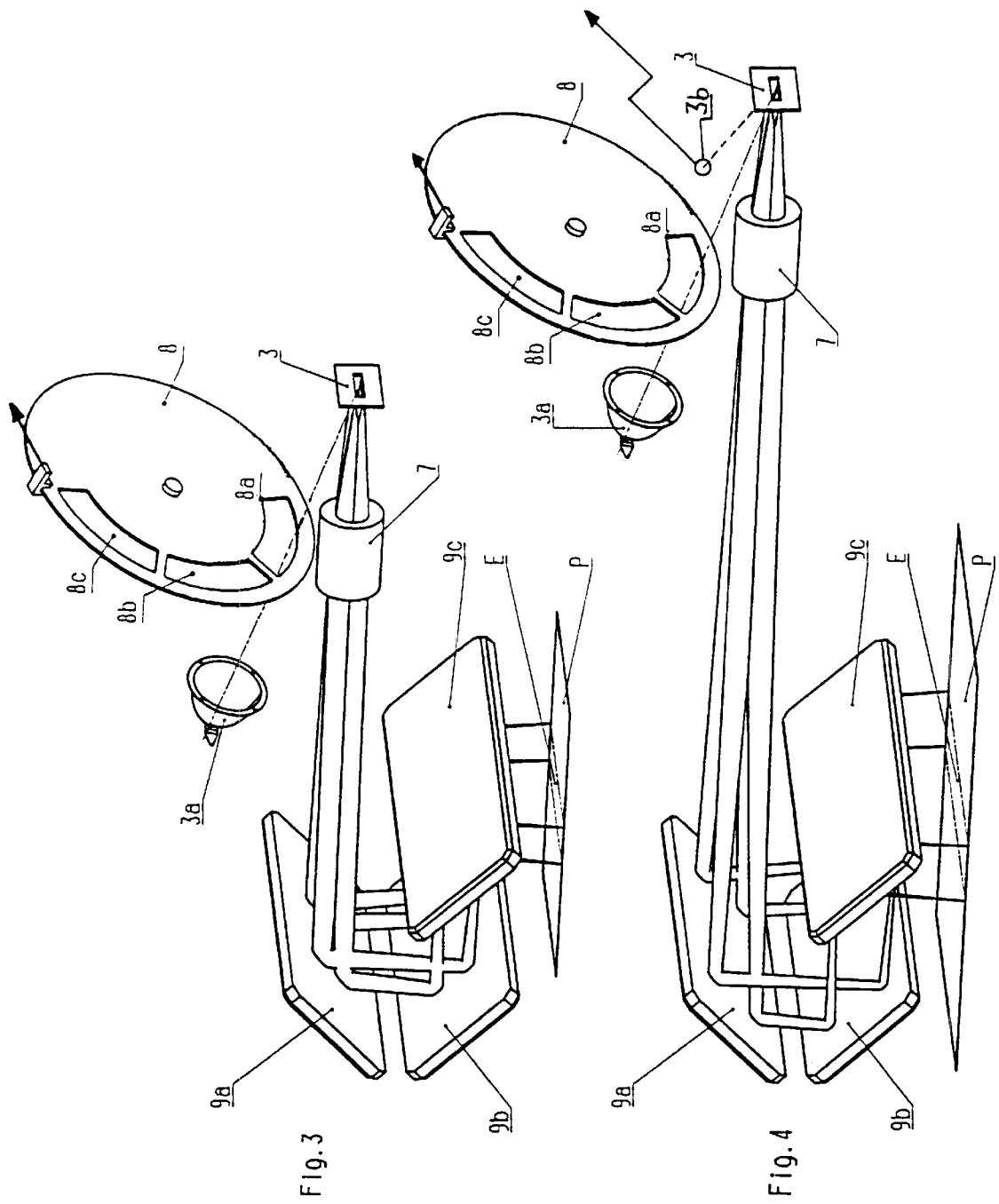

APPARATUS FOR THE MANUFACTURE OF A PHOTOGRAPHIC PRINT

This application claims priority under 35 U.S.C. §§119 and/or 365 to German Patent Application No. 299 02 750.3 filed in Germany on Feb. 17, 1999; the entire content of which is hereby incorporated by reference.

1. Field of the Invention

The invention relates to apparatus for the manufacture of photographic prints, especially a copy of image data of an original which are present in electronic form, by preferably strip wise exposure of the image data of the original onto a photographic copier material. The image data are thereby produced by way of a scanning arrangement and subsequently processed in the image data processing arrangement in order to be transferred into the electronic form which is necessary for the exposure.

2. Background Art

Digital print producing apparatus on photographic basis, so-called digital photographic printers, produce paper prints or copies by recording the image information of the underlying originals which is stored in electronic form onto a photographic copier material. For example, the image information of the original can be optically produced for each image by a digitally operated mirror matrix. Accordingly, an optical representation of the original can be produced and this optical representation of the original copied and thereby recorded on the copier material.

Using the micro-mirrors of the mirror matrix for line by line or strip wise exposure allows for the production of photographic prints of theoretically any sized in the direction transverse to the lines or strips.

Strip shaped portions of the original which in their longitudinal direction extend across the whole original can be respectively optically produced by way of the mirror matrix and sequentially exposed in a corresponding three-dimensional arrangement onto the copier material. The correct spatial positioning of the exposed strips is thereby achieved by displacement of the copier material relative to the exposure light path. This can be achieved by advancement of the copier material or by a correspondingly movable projection optic. The relative displacement is carried out synchronously with the change of the illustrated strips of the original. If the strips are several lines wide, adjacent strips can also overlap, if desired. If the copier material, depending on the degree of overlap, is repeatedly exposed in certain regions, this must be taken into consideration for adjustment of the amount of copier light used in the individual exposure steps. This exposure process is known under the acronym TIG [Time integration grayscale].

Relatively satisfactory photographic prints can be manufactured with the above described methods and the use of a commercially available micro-mirror matrix. However, the manufacturing cost for such an apparatus for the manufacture of photographic prints are relatively high and the speed with which the photographic prints can manufactured is often unsatisfactory, especially when the light intensity per unit area during the exposure is relatively low, so that long exposure times are required.

SUMMARY OF THE INVENTION

The present invention now provides an apparatus which overcomes the above disadvantages with prior art apparatus.

According to invention, the apparatus for the manufacture of a photographic print on a copier material includes a scanning arrangement for scanning an original for the generation of image data for the manufacture of the photographic print. The apparatus further includes an image data processing arrangement for the processing of the image data into control signals for the manufacture of the photographic print. An exposure arrangement with a projecting optic for the manufacture of the photographic print is connected to the image data processing arrangement. The illumination arrangement preferably includes a broadband light source, for example a halogen light source, and a filter arrangement which is positioned in the light path between the light source and a mirror matrix for adjustment of especially selected light amounts for selected spectral regions.

While in corresponding prior art arrangements very expensive light sources are often used and the light which is projected by the micro mirrors of the mirror matrix onto a photo sensitive copier material is filtered, it has been surprisingly found that high light densities or light intensities can be produced with a conventional, preferably broadband light source, for example a halogen light source. The exposure with the individual colors of the light spectrum that are necessary for an appropriate exposure of certain image elements can be adjusted with an appropriate filter for different colors and appropriate activation of the micro-mirrors of the mirror matrix.

The filter arrangement which is, for example, a filter wheel, can be provided along its whole circumference with several filter regions for each base color in order to avoid down times and to increase the speed of the apparatus.

A transport arrangement for a light sensitive copier material is provided for the manufacture of the photographic print by the exposure arrangement, whereby the transport speed of the light sensitive copier material is detected or monitored by use of a sensor. The sensor can be, for example, an optical scanner, a mechanical sensor or the like, to detect the actual transport speed of the copier material on the transport arrangement. The measured transport speed of the photographic print is then preferably used for controlling the speed of the transport arrangement and/or the exposure time, or the light intensity by way of the mirrors or the light source. This means that, the transport speed is readjusted on the basis of the actual speed of the copier material, for example by way of a step motor within a control loop, or the exposure time is adjusted by the mirrors of the mirror matrix. Of course, as mentioned above, the brightness of the light source can also be changed, or an additional darkening or brightening arrangement can be provided, for example in an LCD which is shone through, or the like. Of course, the mentioned measures can also be combined within a control loop and not only individually used.

In order to monitor the intensity of the light source both integrally as well as spectrally, a measuring sensor, for example a photo cell, can be provided which integrally or for each individual color carries out a measurement of the light which is not used for projection onto the photo sensitive copier material. In this manner, the power of the light source can be readjusted, or it can be determined when the light source must be changed, for example, automatically or manually. A carousel, a sled or the light can be provided for automatic or manual change, which is activated when the value detected by the measuring sensor is outside the tolerance. On the other hand, for example upon a decrease in the light output, initially more current or a higher voltage can be fed to light source also by way of a control loop, in order to extend the life of the light source, for example a halogen lamp.

The filter arrangement can be constructed as a filter wheel, as an additive or subtractive color filter and the like.

BRIEF DESCRIPTION OF THE DRAWINGS

Embodiments with features according to the invention are further described in the following, whereby further features, advantages and objects according to the present invention are disclosed by reference to the attached drawings, wherein:

FIGS. 3 and 4 show two schematic, perspective illustrations in principle for illustration of an embodiment according to the invention which allows adjustment of the enlargement;

DETAILED DESCRIPTION OF THE PREFERRED EMBODIMENT

The embodiments discussed in the following start from the premise that an image, for example in the form of a negative, has been scanned in order to obtain therefrom image data which are present in stored electronic form to be projected onto a photo sensitive copier material and thereby recorded thereon.

A conventional scanning arrangement can thereby be used to obtain the image data of the original for reproduction for manufacture of the photographic print. The image data are subsequently processed in an image data processing arrangement [not illustrated] for the processing of the image data into control signals for the manufacture of the photographic print. The scanning and processing of image data is sufficiently known from the prior art and need not be further discussed herein. The processed image data can then be stored in a memory in order to be subsequently processed by the apparatus with features according to the invention. It goes without saying that the principal invention according to the present disclosure is principally oriented to the exposure arrangement and that accordingly the scanning arrangement and the image data processing arrangement can be changed. The exposure arrangement according to the invention can accordingly be connected to any suitable scanning arrangement or image data processing arrangement which can accordingly also be made the subject of independent patent claims. The image information of the original which consists of the whole brightness and color information for each individual image point of the original to be copied can be processed by the apparatus in accordance with the invention online or through a memory. For the control process, the image information can be recalled pixel by pixel from a memory [not illustrated] or separately by color portion.

The image data of a strip shaped section of the original include all of the brightness and color information of those image points of the original which are part of that strip shaped section.

Figure 1:
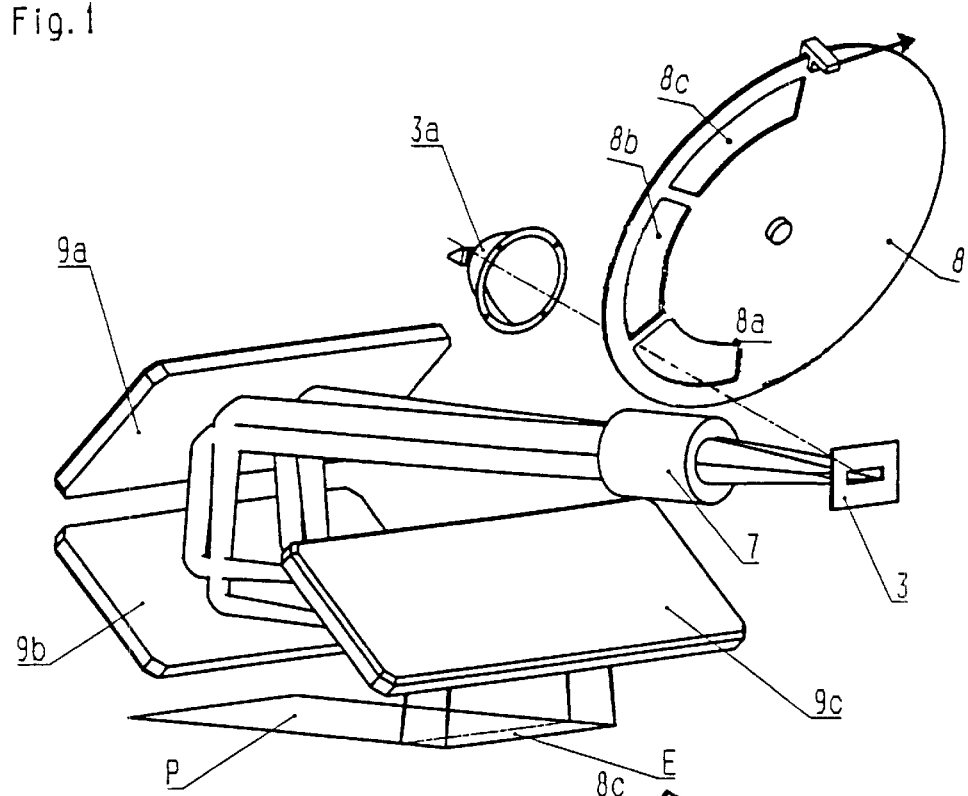
FIGS. 1 and 2 show two sketches of an embodiment in accordance with the invention in a schematic, perspective illustration.

The principle construction and function of an exposure arrangement which features according to the invention is illustrated in FIG. 1. A light source 3a which preferably provides a continuous, broadband light spectrum shines light through a filter arrangement 8, here a filter wheel, with three color filters 8a, 8b, 8c. The filter wheel can correspond in construction and operation to a conventional filter wheel which is sufficiently known and accordingly need not be further described here. The different color filters 8a, 8b, 8c can be of equal size or different size, depending on the light sensitivity characteristics of the copier material to be exposed. Also, more than three color filters can be provided, for example, six or more, whereby two respectively have the same filter characteristics or color characteristics in order not to produce down times as occur with the filter wheel 8 according to FIG. 1.

The spectral portion of the light spectrum selected by way of the filters 8a, 8b, 8c of the filter wheel 8 impinges on a mirror matrix 3 with mirrors that are movable individually or in groups, which mirror matrix is also known under the term "digital micro-mirror field" or "DMD" [Digital Micromirror device].

The light which is reflected by the mirror matrix or the digital micro-mirror field by the movement of individual mirrors or mirror groups is projected through a lense onto an arrangement of redirecting mirrors 9a, 9b, 9c by which projection onto a light sensitive copier material P is achieved. A strip wise exposure is carried out on the light sensitive copier material P, whereby the redirecting mirror 9c is moved across the copier material P according to the image information to be recorded. Of course, conversely the copier material P can be moved, while the mirror arrangement remains stationary.

As already mentioned, the movability of the projection optic or the relative movement of the exposure strip I relative to the copier material P is achieved by three mirrors 9a, 9b, 9c inserted in the light path between the lense seven and the copier material P. They are displaced parallel to the plane of the copier material P in a direction perpendicular to the longitudinal direction of the exposure strip I buy suitable drive means, for example step motors. The two redirecting mirrors 9a and 9b are stationary relative to one another and are at a right angle relative to one another so that they redirect the light path by 180°. The redirecting mirror 9c is positioned parallel to the redirecting mirror 9b and redirects the light path by 90° onto the copier material. The redirecting mirror 9c is movable in the same direction as the two redirecting mirrors 9a, 9b, but with twice the speed as the two redirecting mirrors 9a and 9b so that the optical image length between the lense 7 and the copier material P remains constant independent of the position of the redirecting mirrors. The strip shaped exposure region I is moved across the copier material by the movement of the redirecting mirrors as is clearly apparent from FIG. 1 when regarded in combination with FIG. 2.

The required relative movement can also be carried out by corresponding adjustment of the whole projection optic including the digital micro mirror field.

Figure 2:
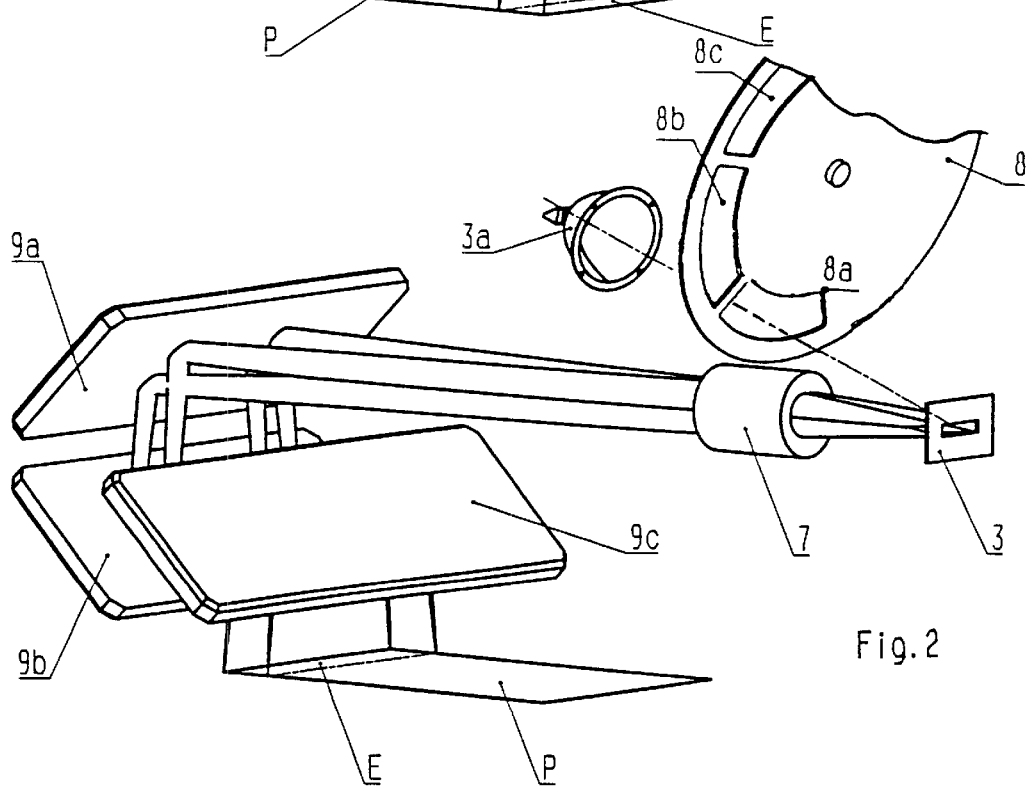

FIGS. 3 and 4 further show how the enlargement of the projection system can be changed with a movable projection optic according to FIGS. 1 and 2. As is apparent, the distance between the lense 7 and the digital micro mirror field 3 can be adjusted or the optical image length between the lense 7 and the copier material P. FIGS. 3 and 4 show the redirecting mirrors and the lense at two different adjustments of an enlargement scale. The enlargement can also be changed in a different manner, for example, by changing the distance between the redirecting mirror 9c and the copier material P and by a corresponding readjustment of the lense 7.

FIG. 4 further shows that a sensor, for example, in the form of a photo cell 3b, can be provided to detect light and to analyze it according to measurement technology, in particular the light reflected by the micro mirror field which is not directed into the lense 7. This light or the data derived therefrom by the sensor 3b can be used for testing of the light source, especially a halogen lamp 3a. By way of these data which can be detected both as a whole as well as spectrally separate, the light quality of the lamp 3a can be determined. It is also possible to determine a point in time therefrom at which the light source or lamp 3a needs to be exchanged. This can be the case, for example, when the intensity of the light source 3a is lower in certain color regions of the spectrum. On the other hand, the data obtained can also be used for control of the light source by changing the current or voltage supplied, in order to maintain the light quality and thereby the quality of the photographic prints to be manufactured. The arrow originating from the sensor 3b indicates sensor conductors which can lead to an electronic analysis unit. Correspondingly, a data collector unit can also be provided at the upper end of the filter wheel 8 through which the position of the filter wheel 8 or its filters or color filters 8a, 8b, 8c is detected relative to the light path between the lamp 3a and the micro mirror field 3.

Figure 5:
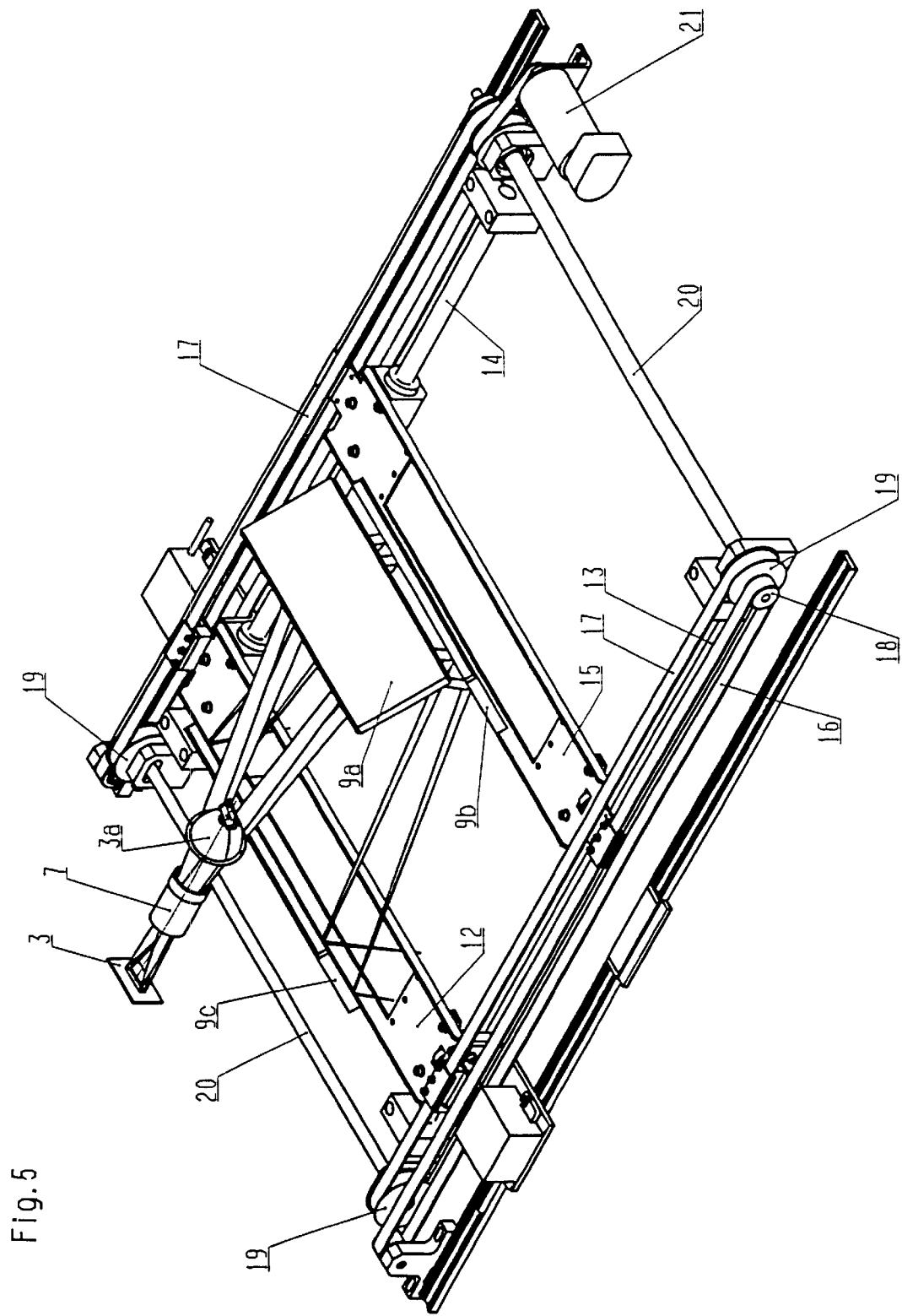
FIG. 5 is a partial view of an embodiment with features according to the invention, whereby the filter arrangement has been omitted for reasons of clarity.

FIG. 5 shows how a projection arrangement according to FIGS. 1 and 2 can be practically realized. Two guide rods 13 and 14 are mounted in a not illustrated apparatus frame on which two mirror sleds 12 and 15 are movable parallel to one another. The redirecting mirror 9c is mounted on the mirror sled 12 and the two redirecting mirrors 9a and 9b are mounted on the mirror sled 15. Two transport belts 16 and 17 extend along both sides of the two mirror sleds 12 and 15 and respectively between two pulley pairs 18 and 19. The pulleys 18 and 19 sit pairwise on the common drive shafts 20 and are synchronously driven by a drive motor 21 controlled by a control 2 which is not illustrated here. Pulleys 18 associated with the transport belt 16 have exactly half the diameter of the pulleys 19 associated with the transport belt 17. The first mirror sled 12 is fastened to the transport belt 17 and the second mirror sled 15 to the transport belt 16. The redirecting mirrors 9c or 9a and 9b mounted on the mirror sleds 12 and 15 can thereby be adjusted parallel to the guide rods 13 and 14 by way of the drive motor 21, whereby the redirecting mirror 9c always moves with twice the speed of the two redirecting mirrors 9a and 9b.

Of course, it is also possible within the framework of this invention to divide the strip shaped portions A of the original into more than two sections, whereby then correspondingly more lenses are provided for the projection and the remaining components are correspondingly adapted.

In the only verbally described examples, the partial exposure regions are respectively seamlessly adjacent. In order to render the whole arrangement less sensitive to adjustment errors, it can be advantageous to somewhat overlap the partial exposure regions [and the underlying sections of the original], for example by about 1–50 pixel. Because of the resulting double exposure in the region of overlap, a corresponding correction [reduction of the brightness] of the representations of the sections of the original produced by way of the converter device is required in the regions of overlap. For example, the brightness of the image points in the overlapping regions can be linearly reduced to zero from the inside out.

The electro-optical converter device 3 can principally be of any active or passive type operating pixel by pixel. Examples therefore are, as already mentioned, cathode ray tubes, light diode fields, electro-luminescence fields or liquid crystal fields. Especially advantageous however are so-called digital micro mirror fields [DMD=digital mirror device] which are also used, for example, in large picture projection apparatus. A typical digital micro mirror field suited for the purpose of the invention includes on one chip an array of 1280×1024 mirrors, which by electrical control can be selectively swivelled between two defined trip positions. For the purpose of the present invention, for example, only a strip shaped region of the micro mirror field is used including 1280×300 individual mirrors.

Such micro mirror fields are naturally operated in reflection, and are thus passive. In the practical application, they are positioned in front of the pupil of a projection lense in such a way that the micro-mirrors direct the light impinging thereon into the projection lense in one trip position and past the projection lense in the other trip position. The intensity modulation of the reflected light is thereby carried out by intermittent operation of the micro-mirrors at a corresponding activation rate. The construction, control and possible applications of such digital micro mirror fields are described in detail in the relevant publications of the manufacturers, for example the company Texas Instruments, Houston, Tex., U.S.A., and are not subject of the present invention.

Figure 7:
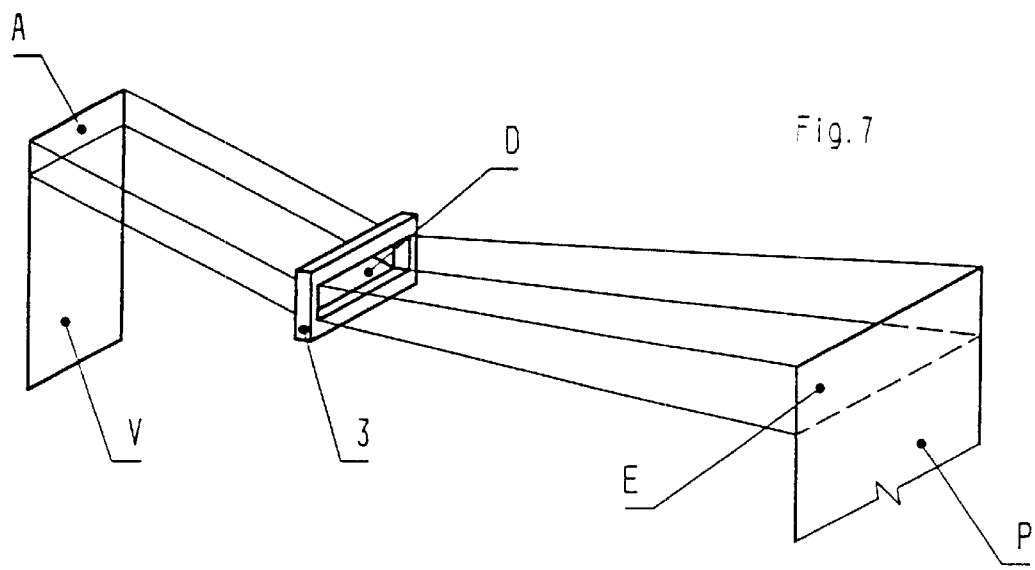
FIGS. 6 to 8 show three schematic illustrations which illustrate a possible operation of the apparatus in accordance with the invention.
Figure 6:
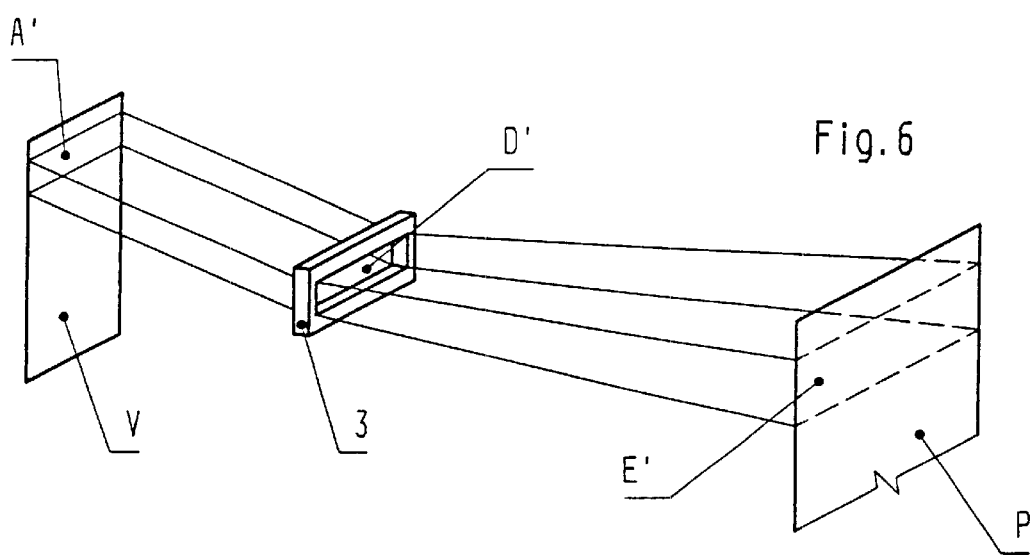
Figure 8:
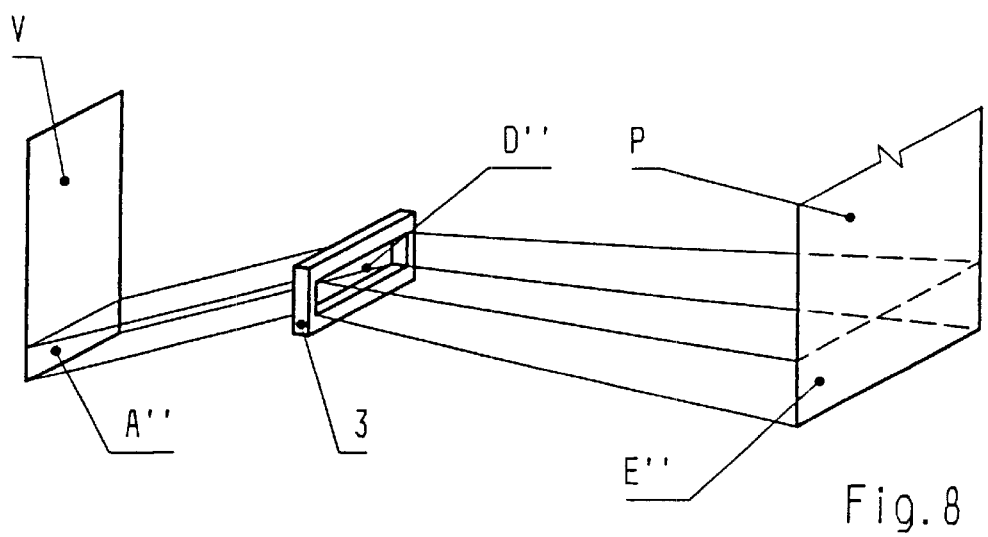

FIGS. 6 to 8 illustrate the principle of the line by line or strip wise exposure. The original represented by the total stored brightness and color information for each of its individual image points is referred to by V. The control 2 (not illustrated) reads in the image information of a first strip shaped portion A of the original V and controls therewith an electro-optical converter device 3 operating pixel by pixel and producing an optical image representation D of the strip shaped section A from the signals fed thereto. The electro-optical converter device 3 can be, for example, a light diode field with, for example, 1280×300 individual diodes or preferably, as will be further described below, or a digital micro-mirror field with a corresponding number or larger number of individual mirrors. The also strip shaped, optical representation D of the strip shaped portion A of the original V and produced by the electro optical converter device 3 is now projected onto a photographic copier material P by way of a not illustrated projection optic in a strip shaped [in this example stationary] exposure region E and thereby recorded thereon [FIG. 7]. Subsequently, a further strip shaped portion A' is read in, an optical representation D' is produced therefrom and the latter is recorded on the copier material P which is simultaneously advanced by a corresponding distance relative to the exposure region E [FIG. 6]. The whole process is now repeated until the complete original has been covered and the last strip shaped section A" of the original has been read in, an optical representation D" has been produced and the latter has been projected onto the copier material P [FIG. 8].

As will be apparent, the strip shaped sections A of the original do not lie side-by-side but overlap to a large degree [transverse to their longitudinal direction]. This also results in overlap of the strips projected onto the copier material P so that the copier material P depending on the degree of overlap is multiply exposed. This multiple exposure is taken into consideration by correspondingly reducing the brightness values of the individual image points of the optical representation D of the sections A [possibly color selective] by way of the control 2 so that the sum of the copier light amounts impinging on the copier material in the respective image points is once again correct. This exposure method is generally known under the term TIG [Time Integration Grayscale].

Up to this point, the process corresponds to the prior art and therefore does not require any further description.

As will be apparent, the length of the strip shaped sections A covering the whole width of the original correspond to the length [the usable surface] of the electro-optical converter device 3. The resolution in longitudinal direction of the strips this thereby determined by the number of individual pixels of the converter device 3 in longitudinal direction. However, the resolution at higher enlargement scales [pictures of large format] achievable with the converter devices commercially available today [maximum number of pixels in longitudinal direction about 1280] is in many cases qualitatively not sufficient. This is where the invention starts.

The strip shaped portions of the original can also be divided into two or more sections positioned one behind the other in longitudinal direction and a separate representation can be produced from each section by way of the electro-optical converter device, which representation fills the whole length of the converter device. With a projection optic especially constructed for this purpose, these separate representations are now projected onto the copier material in the correct location and in partial exposure strips positioned in longitudinal direction one behind the other, so that the exposed partial strips together include the image information of the strip shaped portion of the original consisting of the sections. Because of this division of the strip shaped portions of the original into two or more sections, twice the number or a multiple of the number of pixels is available in longitudinal direction of the converter device so that even for copies of very large format [typically up to a format of 12" by 18"] a sufficiently high resolution and therefore a high print quality is achievable.

An also usable process can be described by of an example, wherein each strip shaped portion A of the original V is divided into two sections. From one section, an optical representation can be produced by way of the electro-optical converter device 3 and projected onto the copier material P in a partial exposure region. A correspondingly different optical representation can be produced from the other section and another partial exposure region can be arranged. The production of the two representations and their projection onto the copier material is carried out sequentially.

A somewhat wider electro-optical converter device 3 can be used so that respectively two strip shaped sections of the original can be illustrated simultaneously and spatially parallel by way of the same converter device and by using different pixel regions. An upper representation can be produced from the one strip shaped section of the original V and a lower representation can be produced from the other section. These two representations are then projected simultaneously and in the right location onto the copier material P in two strip shaped partial exposure regions lying one behind the other, by way of a projection optic especially constructed for this purpose.

It will be appreciate by those skilled in the art that the present invention can be embodied in the other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Apparatus for the manufacture of a photographic print on a light sensitive copier material, comprising:

a scanner for producing image data from an original;

an image data processing arrangement for processing the image data into control signals; and an exposure arrangement having a projection optic for projecting an optical representation of the image data onto the copier material according to the control signals, wherein the exposure arrangement further comprises a mirror matrix with individually movable mirrors, an illumination arrangement, and a filter arrangement positioned in a projection light path between the light source and the mirror matrix, for separating out preselected spectral ranges of light from the light produced by the light source;

wherein the projection optic includes movable components for permitting a relative movement between a strip shaped exposure region of the original and the copier material; and wherein the movable components are first, second and third redirecting mirrors and the apparatus further comprises drive means for linearly moving the redirecting mirrors parallel to the copier material and perpendicular to a longitudinal direction of the strip shaped exposure region of the original, wherein the first and second redirecting mirrors are in a fixed spatial arrangement relative to one another and redirect the light in a projection light path by 180°, the third redirecting mirror is positioned antiparallel to the second redirecting mirror and redirects the light in the light path perpendicularly onto the copier material, and the drive means are constructed for moving the third redirecting mirror at twice the speed of the first and second redirecting mirrors.

2. Apparatus according to claim 1, further comprising:

a transport arrangement for transporting the copier material;

a sensor for detecting a transport speed of the copier material being transported; and a control means for controlling the transport speed.

3. Apparatus according to claim 2, wherein the transport speed detected by the sensor is used for controlling the speed of the transport arrangement.

4. Apparatus according to claim 2, wherein the transport speed detected by the sensor is used for controlling at least one of an exposure time and intensity by way of the mirrors of the mirror matrix.

5. Apparatus according to claim 1 further comprising a light sensor for detecting light of the light source, that is not used for the manufacture of the photographic print, to permit control of the output of the light source.

6. Apparatus according to claim 1, wherein the filter arrangement is selected from one of a of a filter wheel, an additive filter arrangement, a subtractive filter arrangement, and a filter with individually movable color filters.

7. Apparatus of claim 1, wherein the illumination arrangement is a broadband light source.

8. Apparatus of claim 7, wherein said light source is a halogen light source.

* * * * *